Patented Jan. 7, 1936

2,026,647

UNITED STATES PATENT OFFICE 2,026,647

PRODUCTION OF HALOGENATED INDANTHRENES

James Ogilvie, Buffalo, N. Y., assignor to National Aniline & Chemical Co., Inc., New York, N. Y., a corporation of New York No Drawing. Application May 3, 1930, Serial No. 449,689

12 Claims. (Cl. 260—31)

This invention relates to a process for the production of halogen derivatives of N-dihydro-1.2.2'.1'-anthraquinonazine and the products so produced. It relates more especially to improvements in the process of chlorinating N-dihydro-1.2.2'.1'-anthraquinonazine (also known, and hereinafter referred to, as indanthrene) for the production of polychlor-derivatives of indanthrene.

It is well known that indanthrene can be chlorinated by subjecting it to the action of thionyl chloride or of sulfuryl chloride in the presence of chlorbenzene at elevated temperatures, e. g., 150° C. or higher. These known methods, however, have the disadvantage of giving a chlor-indanthrene in low yields and of poor quality.

I have now found that an indanthrene, as for example indanthrene, a lower chlorinated indanthrene, etc., can be halogenated by subjecting it to the action of a halogen selected from the group consisting of chlorine and bromine, as for example chlorine, in the presence of a chlorbenzene, particularly a dichlorbenzene, as a solvent or diluent. I have further found that the chlorination of indanthrene by interaction with chlorine in the presence of a chlorbenzene can be readily effected at comparatively low temperatures, preferably at a temperature not above about 40° C., e. g., from about 5° to about 40° C. The halogenation is preferably carried out under ordinary atmospheric pressure, but superatmospheric pressures may be employed if desired.

It has also been discovered that the use of a chlorbenzene as a solvent or diluent in the chlorination of indanthrene permits the production of a chlorinated product in good yields and of excellent purity in that a considerable quantity, if not all, of the impurities present or formed in the reaction remain in solution, while the chlorinated derivative of indanthrene thus produced is substantially insoluble, or only slightly soluble.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

Since, in following the procedure of the present invention, the intermediate halogenated product of indanthrene is produced in the azine or azhydrin form, or a mixture of these forms, it is necessary to subsequently reduce this product to the dihydro-azine form. It has been found that those intermediate halogenated azines or azhydrines which contain approximately 17.5 per cent. to 22 per cent. of halogen in their composition are reduced in sulfuric acid solution by means of a ferrous salt, e. g., ferrous sulfate, to a dihydroazine which contains approximately 16 per cent. to 17 per cent. of halogen in its composition while if reduced with an alkaline sodium hydrosulfite solution a dihydroazine containing approximately 11.5 per cent. to 13 per cent. of halogen in their composition is obtained.

In the practice of the present invention, a suspension of finely-divided indanthrene in a dichlorbenzene, or another chlorine derivative of benzene, is treated with a current of chlorine, preferably at a temperature maintained below 40° C., until a sample of the suspended product upon solution in concentrated sulfuric acid and re-precipitation therefrom by dilution with water shows the desired chlorine-content, for example, 17.5 per cent. or more of chlorine. When the chlorination is complete, the reaction-mass is filtered and the residue free from solvent is dissolved in concentrated sulfuric acid and the resulting sulfuric acid solution poured into an aqueous solution of ferrous sulfate. The precipitated dyestuff which consists essentially of a chlor-indanthrene in the dihydro-azine form, is filtered off, washed, and, if desired, dried.

As an illustrative embodiment of a manner in which the invention may be carried out in practice, the following example is presented. The parts are by weight.

*Example.*—Into a well-stirred suspension of 225 lbs. of finely divided indanthrene in 1350 lbs. of technical dichlorbenzene (known commercially as "Solvent 75" and comprised mainly of o- and p-dichlorbenzene) there is slowly passed a current of chlorine, e. g., about 20 lbs. of chlorine per hour, the temperature of the reaction-mass being maintained at about 15° to 30° C., until about 145 to 150 pounds of chlorine have been added, the time of addition being about 7 to 8 hours. The reaction-mass is then stirred for about 24 hours, the temperature being held at about 20° to 25° C. A sample of the suspended material is then filtered off, washed with benzene to free it from the chlorbenzene solvent, and dried at 100° C. The dried sample is then dissolved in about 3 parts of sulfuric acid monohydrate, the resulting solution poured into about 300 parts of water, and the precipitate filtered off, washed with water until free from acid, dried at 100° C., and analyzed for its chlorine-content. If the chlorine-content is lower than that desired, for example, if it is lower than 17.5 per cent., additional chlorine is passed into the mixture until a product containing the desired chlorine-content is obtained. When the chlorination is complete, the reaction-mass is filtered and the residue washed with benzene until it is substantially free from "Solvent 75". The washed product is then dried. It consists chiefly of a chlorinated indanthrene in the azine or azhydrin form, or of a mixture of these forms.

The dried product is then dissolved in about 2800 lbs. of sulfuric acid monohydrate at a temperature of about 30° C. or lower. A copious evolution of hydrogen chloride takes place. When the hydrogen chloride has substantially ceased to be given off, the cooled sulfuric acid solution is rapidly added with stirring, to a solution of 380 lbs. of crystallized ferrous sulfate dissolved in 2800 lbs. of water, the temperature of the ferrous sulfate solution being at about 70° C. After stirring the mixture for a short time, it is diluted with about 28,000 lbs. of cold water, and the precipitated chlor-indanthrene filtered off, and washed first with hot water until substantially free from acid and then with hot, dilute sodium carbonate solution until a slightly alkaline filtrate is obtained, and finally with water until it is substantially neutral to brilliant yellow test paper. The chlor-indanthrene thus obtained contains in the dried state about 16 to 17 per cent. of chlorine which approximately corresponds to that required for trichlor-indanthrene.

In the above example, it will be understood that the proportions, temperatures and other conditions may be varied. For example, the chlorination may be carried out at temperatures higher than 30° C. but lower temperatures are to be preferred in order to retain, as much as possible, the chlorine and hydrogen chloride in the reaction-mixture, since chlorination continues for a considerable time after all of the chlorine has been added. Considerable variation may occur in the rate of chlorination, but the required degree of chlorination can be obtained by passing in more chlorine or by increasing the time of chlorination. For best results, the surface above the reaction mixture is preferably kept free from drafts of air.

The chlorination product before treatment with sulfuric acid and precipitation by dilution with water therefrom (known as acid pasting), and which contains considerable amounts of loosely held hydrogen chloride in combination, varies in color from violet to yellowish-green, and is probably a mixture of the azine, azhydrin and perhaps other forms of chlor-indanthrene. The acid pasted product, however, is almost invariably of a yellowish-green color even though its chlorine content may vary from 17.5 to 22 per cent. or higher. Upon reduction with ferrous sulfate, the product undergoes a loss in chlorine-content which varies according to the initial amount of chlorine which may be present in the unreduced product, and the reduced product thus obtained is of a bluish-violet color, and ordinarily shows a chlorine-content of approximately 16 to 17 per cent. The amount of crystallized ferrous sulfate employed may be in large excess of that given in the example but ordinarily an amount equal to about 1.7 to 2 times the weight of the initial indanthrene is sufficient. It is preferably dissolved in an amount of water varying from about six-tenths to one part by weight of the sulfuric acid employed. Upon reduction of this product with an alkaline sodium hydrosulfite solution the chlorine content falls to about 11.5 to 12.5 per cent.

The product obtained by the ferrous sulfate reduction, and which contains 16 to 17 per cent. chlorine, is excellent for use in the pad-jig (pigment padding) process for dyeing fabrics, and in this respect is much superior to the product obtained by the hydrosulfite or other known methods of reduction.

It will be understood that bromine may be used in place of chlorine in effecting the halogenation, and that a sub-chlorinated indanthrene in the azine, azhydrin or dihydroazine form may be further halogenated by the process of the present invention for the production of higher halogenated derivatives.

It may be pointed out that the presence of neutralizing or acid-binding agents during the step of chlorination is to be avoided, since the presence of hydrogen chloride in the reaction mixture is highly desirable as it materially aids in effecting the chlorination. The chlorination may be carried out in the presence or absence of catalysts as halogen carriers.

It is evident that the dichlorbenzene and the benzene used in the process may be recovered for re-use in any suitable manner.

Since certain changes in carrying out the above process, and certain modifications in the composition which embody the invention may be made without departing from its scope, it is intended that all matter contained in the above description shall be interpreted as illustrative and not in a limiting sense.

I claim:

1. A process for the production of a halogenated indanthrene, which comprises reacting an indanthrene with a halogen selected from the group consisting of chlorine and bromine in a reaction mixture containing a chlorbenzene as a diluent.

2. A process for the production of a halogenated indanthrene which comprises reacting indanthrene, in a reaction mixture containing a chlorbenzene as a diluent and at a temperature not above about 40° C., with a halogen selected from the group consisting of chlorine and bromine.

3. A process for the chlorination of indanthrene which comprises reacting indanthrene with chlorine in a reaction mixture containing a dichlorbenzene as a diluent.

4. A process for the chlorination of indanthrene which comprises passing chlorine gas into a suspension of indanthrene in technical dichlorbenzene while maintaining the temperature between 5° and 40° C.

5. A process for the chlorination of indanthrene which comprises passing a current of chlorine gas into a suspension of finely divided indanthrene in technical dichlorbenzene while maintaining the temperature between about 15° and 30° C.

6. A process for the production of a chlor-indanthrene which comprises chlorinating indanthrene with chlorine in a reaction mixture containing a chlorbenzene as a diluent to produce a chlor-derivative of indanthrene which contains from about 17.5 to about 22 per cent. of chlorine, dissolving said chlorinated derivative in concentrated sulfuric acid, and adding the resulting sulfuric acid solution to a solution of ferrous sulfate.

7. A process for the production of a chlor-indanthrene which comprises treating a suspension of indanthrene in a chlorbenzene with chlorine at a temperature not above about 40° C. until a chlor-derivative of indanthrene is obtained which contains from about 17.5 to about 22 per cent of chlorine.

8. A process for the production of a chlor-indanthrene which comprises chlorinating indanthrene with chlorine in the presence of a chlorbenzene to produce a chlor-derivative of indanthrene which contains from about 17.5 to about 22 per cent of chlorine, dissolving said chlorinated derivative in concentrated sulfuric acid, adding the resulting sulfuric acid solution to a solution of ferrous sulfate, and isolating precipitated chlor-indanthrene.

9. A process for the production of a chlor-indanthrene which comprises treating indanthrene suspended in a dichlorbenzene with chlorine at a temperature of from about 5° to about 40° C. until a polychlor-derivative of indanthrene containing more than 17.5 per cent of chlorine is obtained, dissolving said polychlor-derivative in sulfuric acid monohydrate at a temperature of about 30° C., adding the resulting sulfuric acid solution to an aqueous ferrous sulfate solution at a temperature of about 70° C., diluting the resulting mixture with water, and isolating the precipitated polychlor-indanthrene which contains about 16 to 17 per cent of chlorine.

10. In the halogenation of an indanthrene, the improvement which comprises forming a suspension of an indanthrene in a chlorbenzene, and reacting a halogen selected from the group consisting of chlorine and bromine with said indanthrene.

11. In the halogenation of indanthrene, the improvement which comprises forming a suspension of indanthrene in a chlorbenzene, and reacting a halogen selected from the group consisting of chlorine and bromine with said indanthrene.

12. In the halogenation of indanthrene, the improvement which comprises forming a suspension of indanthrene in a dichlorbenzene, and reacting a halogen selected from the group consisting of chlorine and bromine with said indanthrene.

JAMES OGILVIE.